US011168197B2

(12) United States Patent
Hamatani et al.

(10) Patent No.: US 11,168,197 B2
(45) Date of Patent: Nov. 9, 2021

(54) RUBBER COMPOSITION AND TIRE

(71) Applicant: BRIDGESTONE CORPORATION, Tokyo (JP)

(72) Inventors: Satoshi Hamatani, Tokyo (JP); Hidenobu Akahane, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 97 days.

(21) Appl. No.: 16/739,776

(22) Filed: Jan. 10, 2020

(65) Prior Publication Data

US 2020/0148852 A1 May 14, 2020

Related U.S. Application Data

(63) Continuation of application No. PCT/JP2018/023675, filed on Jun. 21, 2018.

(30) Foreign Application Priority Data

Jul. 14, 2017 (JP) .............................. JP2017-138338

(51) Int. Cl.
C08K 3/04 (2006.01)
B60C 1/00 (2006.01)
C08K 3/36 (2006.01)

(52) U.S. Cl.
CPC .............. C08K 3/04 (2013.01); B60C 1/0016 (2013.01); C08K 3/36 (2013.01); C08K 2201/006 (2013.01)

(58) Field of Classification Search
CPC ...... C08K 3/04; C08K 3/36; C08K 2201/006; B60C 1/0016
USPC ....................................................... 524/493
See application file for complete search history.

(56) References Cited

U.S. PATENT DOCUMENTS

| 7,214,263 | B2 | 5/2007 | Kakiuchi et al. |
| 8,980,990 | B2 | 3/2015 | Horie et al. |
| 2004/0092647 | A1 | 5/2004 | Chauvin |
| 2008/0110552 | A1 | 5/2008 | Arnold |
| 2011/0166254 | A1 | 7/2011 | Nishimura |
| 2011/0184085 | A1 | 7/2011 | Otsubo |
| 2012/0083571 | A1 | 4/2012 | Hasegawa |
| 2014/0005319 | A1 | 1/2014 | Ichikawa |
| 2015/0298511 | A1* | 10/2015 | Kameda .................. C08K 3/04 152/517 |

FOREIGN PATENT DOCUMENTS

| CN | 101535059 A | 9/2009 |
| CN | 102443206 A | 5/2012 |
| CN | 101993547 B | 1/2013 |
| EP | 0608892 A1 | 8/1994 |
| EP | 3181633 A1 | 6/2017 |
| JP | 09-059433 A | 3/1997 |
| JP | 2006-104455 A | 4/2006 |
| JP | 2007-131730 A | 5/2007 |
| JP | 3929838 B2 | 6/2007 |
| JP | 2010-285560 A | 12/2010 |
| JP | 4593272 B2 | 12/2010 |
| JP | 2011-074332 A | 4/2011 |
| JP | 2011-132305 A | 7/2011 |
| JP | 2011-140547 A | 7/2011 |
| JP | 2011-153293 A | 8/2011 |
| JP | 2011-174048 A | 9/2011 |
| JP | 2011-184553 A | 9/2011 |
| JP | 2014-84361 A | 5/2014 |
| JP | 2014-185340 A | 10/2014 |
| JP | 5659594 B2 | 1/2015 |
| JP | 5659694 B2 | 1/2015 |
| JP | 2015-206001 A | 11/2015 |
| JP | 2016-074810 A | 5/2016 |
| JP | 2017-114981 A | 6/2017 |
| WO | 2012/147976 A1 | 11/2012 |

OTHER PUBLICATIONS

Extended European Search Report dated Mar. 26, 2021 from the European Patent Office in Application No. 18831014.8.
International Search Report of PCT/JP2018/023675 dated Sep. 11, 2018.

* cited by examiner

Primary Examiner — Ling Siu Choi
Assistant Examiner — Ronald Grinsted
(74) Attorney, Agent, or Firm — Sughrue Mion, PLLC

(57) ABSTRACT

A rubber composition that is capable of providing vulcanized rubber excellent in the abrasion resistance without the deterioration of the crack resistance and the low heat generation property is provided. The rubber composition contains: (A) a rubber component; (B) carbon black having a CTAB specific surface area of 110 to 160 m$^2$/g, a half value width $\Delta D_{50}$ of a peak including a Stokes equivalent diameter $D_{st}$ obtained by a centrifugal sedimentation method of 60 nm or less, and $\Delta D_{50}/D_{st}$ of 0.95 or less; and (C) silica having a CTAB specific surface area of 200 m$^2$/g or more, has a total amount of a content (b) of the carbon black (B) and a content (c) of the silica (C) of 30 to 80 parts by mass per 100 parts by mass of the rubber component (A), and has (b)/(c) of (60 to 85)/(40 to 15).

7 Claims, No Drawings

RUBBER COMPOSITION AND TIRE

TECHNICAL FIELD

The present invention relates to a rubber composition and a tire.

BACKGROUND ART

In recent years, a tire having a small rolling resistance is being demanded for saving the fuel consumption amount of automobiles under the social demands of energy saving and resource saving. The known methods for decreasing the rolling resistance of tires for addressing the demands include a method of using a rubber composition having a hysteresis loss reduced by decreasing the amount of carbon black used, using lower carbon black, or the like, i.e., a rubber composition having a low heat generation property, in a tire member, particularly tread rubber.

For example, for providing a rubber composition for a tire tread that achieves both the abrasion resistance and the low heat generation property and has an enhanced tensile fracture elongation, there is disclosed that a rubber composition for a tire tread is obtained by mixing 30 to 80 parts by weight of carbon black that belongs to a hard carbon black category having a CTAB adsorption specific surface area of 100 to 170 m$^2$/g and a DBP absorption number of 100 to 150 mL/100 g, and satisfies the particular relationship among the aggregate diameter measured by a centrifugal sedimentation method, the shape coefficient, and the like, with 100 parts by weight of diene rubber (see PTL 1).

CITATION LIST

Patent Literature

PTL 1: Japanese Patent No. 5,659,594

SUMMARY OF INVENTION

Technical Problem

The performance of tires has been enhanced only by focusing on the characteristics of carbon black as shown in PTL 1. The achievement of both the abrasion resistance and the crack resistance has been difficult by the use of carbon black having a broad aggregate distribution for providing the heat generation property.

In view of the circumstances, an object of the present invention is to provide a rubber composition that is capable of providing vulcanized rubber excellent in the abrasion resistance without the deterioration of the crack resistance and the low heat generation property, and to provide a tire that is excellent in the abrasion resistance without the deterioration of the crack resistance and the low hysteresis loss.

Solution to Problem

<1> A rubber composition containing:
(A) a rubber component;
(B) carbon black having a cetyltrimethylammonium bromide specific surface area of 110 to 160 m$^2$/g, a half value width $\Delta D_{50}$ of a peak including a Stokes equivalent diameter $D_{st}$ providing a maximum frequency in an aggregate distribution obtained by a centrifugal sedimentation method of 60 nm or less, and a ratio ($\Delta D_{50}/D_{st}$) of the $\Delta D_{50}$ and the $D_{st}$ of 0.95 or less; and
(C) silica having a cetyltrimethylammonium bromide specific surface area of 200 m$^2$/g or more,
having a total amount of the carbon black (B) and the silica (C) of 30 to 80 parts by mass per 100 parts by mass of the rubber component (A), and
having a ratio (b)/(c) of a content (b) of the carbon black (B) and a content (c) of the silica (C) of (60 to 85)/(40 to 15).

<2> The rubber composition according to the item <1>, wherein the carbon black (B) has a compression dibutyl phthalate absorption number of 80 to 110 cm$^3$/100 g.

<3> The rubber composition according to the item <1> or <2>, wherein the rubber component (A) contains natural rubber.

<4> A tire including the rubber composition according to any one of the items <1> to <3>.

Advantageous Effects of Invention

According to the present invention, a rubber composition that is capable of providing vulcanized rubber excellent in the abrasion resistance without the deterioration of the crack resistance and the low heat generation property, and a tire that is excellent in the abrasion resistance without the deterioration of the crack resistance and the low hysteresis loss can be obtained.

DESCRIPTION OF EMBODIMENTS

<Rubber Composition>

The rubber composition of the present invention contains: (A) a rubber component; (B) carbon black having a cetyltrimethylammonium bromide specific surface area of 110 to 160 m$^2$/g, a half value width $\Delta D_{50}$ of a peak including a Stokes equivalent diameter $D_{st}$ providing a maximum frequency in an aggregate distribution obtained by a centrifugal sedimentation method of 60 nm or less, and a ratio ($\Delta D_{50}/D_{st}$) of the $\Delta D_{50}$ and the $D_{st}$ of 0.95 or less; and (C) silica having a cetyltrimethylammonium bromide specific surface area of 200 m$^2$/g or more, has a total amount of the carbon black (B) and the silica (C) of 30 to 80 parts by mass per 100 parts by mass of the rubber component (A), and a ratio (b)/(c) of a content (b) of the carbon black (B) and a content (c) of the silica (C) of (60 to 85)/(40 to 15).

In the following description, the "cetyltrimethylammonium bromide specific surface area" may be abbreviated as a "CTAB specific surface area" or simply as "CTAB", and the "compression dibutyl phthalate absorption number" may be referred to as a "24M4DBP absorption number".

For enhancing the low heat generation property, the abrasion resistance, and the fatigue crack resistance, such measures have been employed that the abrasion resistance and the fatigue crack resistance are enhanced by the use of low structure carbon black having a small growth extent of the aggregate structure and the use of carbon black having a miniaturized particle diameter, and the deterioration of heat generation is suppressed by broadening the aggregate distribution. However, the abrasion resistance and the fatigue crack resistance tend to deteriorate even though the form of the carbon black is controlled in this manner.

It is considered that this is because the large particle diameter component is increased by broadening the aggregate distribution of the carbon black.

On the other hand, the rubber composition of the present invention having the aforementioned features can provide vulcanized rubber excellent in the abrasion resistance without the deterioration of the crack resistance and the low heat generation property. The mechanism therefor is not completely clear, but can be considered as follows.

The heat generation of vulcanized rubber occurs generally through the friction of the filler, such as carbon black and silica, contained in the vulcanized rubber, and accordingly there is a tendency of deterioration of the low heat generation property under the environment where the large particle diameter component of the carbon black is increased, as described above.

In the present invention, it is considered that the use of the carbon black having a large particle diameter with a CTAB specific surface area of 110 to 160 m$^2$/g and the silica having a fine particle diameter with a CTAB specific surface area of 200 m$^2$/g or more exerts such an effect that the silica having a fine particle diameter enters the voids among the carbon black, and the rubber strongly interacts with the carbon black and the silica in the region of fracture, such as abrasion and cracking, of the vulcanized rubber, resulting in the enhancement of the abrasion resistance and the crack resistance, while retaining the state of the low heat generation property without affecting the aggregation among particles.

In the present invention, accordingly, there is no necessity of the broadening of the aggregate distribution of the carbon black for suppressing the deterioration of heat generation. Furthermore, it is also considered that the aggregate distribution of the carbon black is sharpened by making the $\Delta D_{50}$ of the carbon black to 60 nm or less, and making the ratio ($\Delta D_{50}/D_{st}$) of the $\Delta D_{50}$ and the $D_{st}$ to 0.95 or less, and thereby the increase of the large particle diameter component of the carbon black can be suppressed, resulting in the enhancement of the abrasion resistance and the crack resistance.

The rubber composition and the tire of the present invention will be described in detail below.

[Rubber Component (A)]

The rubber composition of the present invention contains a rubber component (A).

Examples of the rubber component include at least one kind of dine rubber selected from the group consisting of natural rubber (NR) and synthetic diene rubber.

Specific examples of the synthetic diene rubber include polyisoprene rubber (IR), polybutadiene rubber (BR), styrene-butadiene copolymer rubber (SBR), butadiene-isoprene copolymer rubber (BIR), styrene-isoprene copolymer rubber (SIR), and styrene-butadiene-isoprene copolymer rubber (SBIR).

The diene rubber is preferably natural rubber, polyisoprene rubber, styrene-butadiene copolymer rubber, polybutadiene rubber, and isobutylene isoprene rubber, and more preferably natural rubber and polybutadiene rubber. The diene rubber may be used alone, or two or more kinds thereof may be mixed.

The rubber component may contain any one of natural rubber and synthetic diene rubber, or may contain both of them, and the rubber component preferably contains at least natural rubber from the standpoint of the enhancement of the abrasion resistance, the crack resistance, and the low heat generation property.

The proportion of the natural rubber in the rubber component is preferably 70% by mass or more, and more preferably 80% by mass or more, from the standpoint of the enhancement of the abrasion resistance and the crack resistance.

The rubber component may contain non-diene rubber up to a limit that does not impair the effects of the present invention.

[Carbon Black (B)]

The rubber composition of the present invention contains (B) carbon black having a cetyltrimethylammonium bromide specific surface area of 110 to 160 m$^2$/g, a half value width $\Delta D_{50}$ of a peak including a Stokes equivalent diameter $D_{st}$ providing a maximum frequency in an aggregate distribution obtained by a centrifugal sedimentation method of 60 nm or less, and a ratio ($\Delta D_{50}/D_{st}$) of the $\Delta D_{50}$ and the $D_{st}$ of 0.95 or less. Furthermore, the total amount of the carbon black (B) and the silica (C) is 30 to 80 parts by mass per 100 parts by mass of the rubber component (A), and the ratio (b)/(c) of a content (b) of the carbon black (B) and a content (c) of the silica (C) is (60 to 85)/(40 to 15).

(CTAB Specific Surface Area)

The carbon black (B) has a CTAB specific surface area of 110 to 160 m$^2$/g.

In the case where the CTAB specific surface area of the carbon black (B) is less than 110 m$^2$/g, the excellent abrasion resistance and the excellent crack resistance cannot be obtained, and in the case where the CTAB specific surface area thereof exceeds 160 m$^2$/g, the excellent low heat generation property cannot be obtained. The CTAB specific surface area of the carbon black (B) is preferably 115 m$^2$/g or more, and more preferably 120 m$^2$/g or more, from the standpoint of the further enhancement of the abrasion resistance and the crack resistance. The CTAB specific surface area of the carbon black (B) is preferably 157 m$^2$/g or less, more preferably 153 m$^2$/g or less, from the standpoint of the further enhancement of the low heat generation property.

The CTAB specific surface area of the carbon black (B) may be measured by a method according to JIS K6217-3: 2001 (Determination of specific surface area—CTAB adsorption method).

($\Delta D_{50}$ and $D_{st}$)

The carbon black (B) has a half value width $\Delta D_{50}$ of a peak including a Stokes equivalent diameter $D_{st}$ providing a maximum frequency in an aggregate distribution obtained by a centrifugal sedimentation method of 60 nm or less, and a ratio ($\Delta D_{50}/D_{st}$) of the $\Delta D_{50}$ and the $D_{st}$ of 0.95 or less.

The $\Delta D_{50}$ (nm) is the width at the half height of the maximum point of the frequency on the aggregate distribution curve obtained by a centrifugal sedimentation method.

The $D_{st}$ means the aggregate size providing the maximum frequency in the aggregate distribution obtained by a centrifugal sedimentation method according to the method described in JIS K6217-6, and is referred to as a Stokes sedimentation diameter. The $D_{st}$ is designated as the average diameter of the aggregate of the carbon black.

In the present invention, the aggregate distribution of the carbon black means the aggregate distribution based on volume.

The $\Delta D_{50}$ of the carbon black (B) is 60 nm or less.

In the case where the $\Delta D_{50}$ of the carbon black (B) exceeds 60 nm, the abrasion resistance of the vulcanized rubber cannot be obtained. The lower limit of the $\Delta D_{50}$ of the carbon black (B) may not be particularly limited, and is preferably 20 nm or more from the standpoint of the productivity. In this standpoint, the $\Delta D_{50}$ of the carbon black (B) is preferably 20 to 55 nm, and more preferably 25 to 50 nm.

The ratio ($\Delta D_{50}/D_{st}$) of the $\Delta D_{50}$ and the $D_{st}$ of the carbon black (B) is 0.95 or less.

In the case where the ratio ($\Delta D_{50}/D_{st}$) of the carbon black (B) exceeds 0.95, there is a possibility that the fracture capability cannot be retained. The lower limit of the ratio ($\Delta D_{50}/D_{st}$) of the carbon black (B) is not particularly limited, and is preferably 0.50 or more from the standpoint of the reduction of the heat generation property. In this standpoint, the ratio ($\Delta D_{50}/D_{st}$) of the carbon black (B) is preferably 0.50 to 0.90, and more preferably 0.55 to 0.87.

(Compression Dibutyl Phthalate Absorption Number)

The carbon black (B) preferably has a compression dibutyl phthalate absorption number (24M4DBP absorption number) of 80 to 110 cm$^3$/100 g.

The 24M4DBP absorption number (cm$^3$/100 g) is a value obtained by measuring the DBP (dibutyl phthalate) absorption number after applying a pressure of 24,000 psi four times repeatedly according to ISO 6894. The 24M4DBP absorption number is an index for evaluating the skeletal structure of carbon black based mainly on the primary structure thereof, which is used for obtaining the DBP absorption number based on the non-destructive true structure (i.e., the primary structure) by excluding the DBP absorption number based on the deformable and destructive structure (i.e., the secondary structure) formed through the so-called Van der Waals' force.

In the case where the 24M4DBP absorption number of the carbon black (B) is 80 cm$^3$/100 g or more, the rubber reinforcing force is increased to improve the abrasion resistance. In the case where the 24M4DBP absorption number is 110 cm$^3$/100 g or less, the heat generation property is lowered, and the viscosity of unvulcanized rubber is lowered, resulting in good workability in factories.

In this standpoint, the 24M4DBP absorption number is more preferably 80 to 105 cm$^3$/100 g, and further preferably 80 to 100 cm$^3$/100 g.

The kind of the carbon black is not particularly limited, as far as the CTAB, $\Delta D_{50}$, and $D_{st}$ are in the aforementioned range, and examples thereof include GPF, FEF, HAF, ISAF, and SAF. Commercially available products may also be used.

The carbon black (B) may be used alone or as a combination of two or more kinds thereof.

The carbon black (B) is contained in the rubber composition in such an amount that the total amount (d) of the content (b) of the carbon black (B) and the content (c) of the silica (C) is 30 to 80 parts by mass per 100 parts by mass of the rubber component (A).

In the case where the total amount (d) is less than 30 parts by mass per 100 parts by mass of the rubber component (A), the abrasion resistance and the crack resistance of the crosslinked rubber and the tire cannot be obtained, and in the case where the total amount (d) exceeds 80 parts by mass, the excellent low heat generation property of the crosslinked rubber cannot be obtained, and the excellent low hysteresis loss of the tire cannot be obtained.

The total amount (d) is preferably 40 parts by mass or more, and more preferably 45 parts by mass or more, per 100 parts by mass of the rubber component (A), from the standpoint of the further enhancement of the abrasion resistance of the crosslinked rubber and the tire. The total amount (d) is preferably 70 parts by mass or less, and more preferably 60 parts by mass or less, per 100 parts by mass of the rubber component (A), from the standpoint of the further enhancement of the low heat generation property of the crosslinked rubber and the low hysteresis loss of the tire.

In the case where plural kinds of the carbon black (B) are used, the content (b) of the carbon black (B) means the total amount thereof. For example, in the case where the rubber composition contains two kinds of carbon black, i.e., carbon black 1 with a content (b1) and carbon black 2 with a content (b2), the content (b) of the carbon black (B) is calculated by (b1)+(b2).

The carbon black (B) is contained in the rubber composition in such a range that the ratio (b)/(c) of the content (b) of the carbon black (B) and the content (c) of the silica (C) is (60 to 85)/(40 to 15). The range means that the content ratio of the carbon black (B) in the total amount (d) of the content (b) of the carbon black (B) and the content (c) of the silica (C) (((b)/(d))×100) is 60 to 85% by mass.

In the case where the content ratio of the carbon black (B) in the total amount (d) is less than 60% by mass, the fractural property is deteriorated, and in the case where the content ratio thereof exceeds 85% by mass, the heat generation property is deteriorated.

The content ratio of the carbon black (B) in the total amount (d) is preferably 65 to 85% by mass, and more preferably 70 to 85% by mass, from the this standpoint.

[Silica (C)]

The rubber composition of the present invention contains (C) silica having a CTAB specific surface area of 200 m$^2$/g or more.

In the case where the CTAB specific surface area of the silica (C) is less than 200 m$^2$/g, the excellent abrasion resistance and the excellent crack resistance of the vulcanized rubber and the tire cannot be obtained. The upper limit of the CTAB specific surface area of the silica (C) is not particularly limited, but a product having a CTAB specific surface area exceeding 300 m$^2$/g is not currently available.

The CTAB specific surface area of the silica (C) is preferably 210 m$^2$/g or more, more preferably 220 m$^2$/g or more, and further preferably 230 m$^2$/g or more, from the standpoint of the further enhancement of the abrasion resistance and the crack resistance of the vulcanized rubber and the tire.

The CTAB specific surface area of the silica (C) may be measured by a method according to the method of ASTM-D3765-80.

The silica preferably has a BET specific surface area of 100 to 300 m$^2$/g, and more preferably 150 to 250 m$^2$/g. With a BET specific surface area of 100 to 300 m$^2$/g, the aggregation of silica can be suppressed, and the specific surface area that is required for reinforcing the rubber can be secured, thereby facilitating the further enhancement of the abrasion resistance and the crack resistance of the vulcanized rubber and the tire.

The silica (C) is not particularly limited, as far as the CTAB specific surface area thereof is 200 m$^2$/g or more, and examples thereof include wet method silica (hydrated silica), dry method silica (anhydrous silica), and colloidal silica.

The silica having a CTAB specific surface area of 200 m$^2$/g or more may be a commercially available product, which may be available, for example, as Zeosil Premium 200 MP (a trade name), produced by Rhodia S.A.

The silica (C) may be used alone or as a combination of two or more kinds thereof.

The silica (C) is contained in the rubber composition in such a range that the total amount (d) of the content (b) of the carbon black (B) and the content (c) of the silica (C) is 30 to 80 parts by mass per 100 parts by mass of the rubber component (A), and the ratio (b)/(c) of the content (b) of the carbon black (B) and the content (c) of the silica (C) is (60 to 85)/(40 to 15), as described above.

In the case where plural kinds of the silica (C) are used, the content (c) of the silica (C) means the total amount thereof. For example, in the case where the rubber composition contains two kinds of silica, i.e., silica 1 with a content (c1) and silica 2 with a content (c2), the content (c) of the silica (C) is calculated by (c1)+(a).

[Silane Coupling Agent]

The rubber composition of the present invention contains the silica even in a small amount, and therefore the rubber composition of the present invention may contain a silane coupling agent for the enhancement of the dispersibility of the silica and the enhancement of the reinforcing capability by strengthening the bond between the silica and the rubber component.

The content of the silane coupling agent in the rubber composition of the present invention is preferably 5 to 15% by mass or less based on the content of the silica. In the case where the content of the silane coupling agent is 15% by mass or less based on the content of the silica, the effect of improving the reinforcing capability for the rubber component and the dispersibility can be obtained, and the economical efficiency may not be impaired. In the case where the content of the silane coupling agent is 5% by mass or more based on the content of the silica, the dispersibility of the silica in the rubber component can be enhanced.

The silane coupling agent is not particularly limited, and preferred examples thereof include bis(3-triethoxysilylpropyl)disulfide, bis(3-triethoxysilylpropyl)trisulfide, bis(3-triethoxysilylpropyl)tetrasulfide, bis(3-trimethoxysilylpropyl)disulfide, bis(3-trimethoxysilylpropyl)trisulfide, bis(3-trimethoxysilylpropyl)tetrasulfide, bis(2-triethoxysilylethyl)disulfide, bis(2-triethoxysilylethyl)trisulfide, bis(2-triethoxysilylethyl)tetrasulfide, 3-trimethoxysilylpropylbenzothiazoledisulfide, 3-trimethoxysilylpropylbenzothiazoletrisulfide, and 3-trimethoxysilylpropylbenzothiazoletetrasulfide.

The rubber composition of the present invention may contain a filler other than the carbon black and the silica, and examples of the filler include a metal oxide, such as alumina and titania.

(Additional Components)

The rubber composition of the present invention may contain additional components that are generally used in the field of rubber industries, such as a vulcanizing agent, a vulcanization accelerator, zinc oxide, stearic acid, and an anti-aging agent, in such a range that does not impair the object of the present invention, in addition to the rubber component (A), the carbon black (B), and the silica (C). The additional components used are preferably commercially available products. The rubber composition may be prepared in such a manner that the rubber component, the carbon black (B), the silica (C), and the additional components appropriately selected are mixed and kneaded with a closed kneading device, such as a Banbury mixer, an internal mixer, and an intensive mixer, or a non-closed kneading device, such as rolls, and then subjected to heating, extrusion, and the like.

<Vulcanized Rubber and Tire>

The vulcanized rubber of the present invention is rubber obtained by vulcanizing the rubber composition of the present invention, and is excellent in the abrasion resistance without the deterioration of the crack resistance and the low heat generation property. Accordingly, the vulcanized rubber of the present invention can be applied to various rubber products, such as a tire, antivibration rubber, seismic isolation rubber, a belt, such as a conveyer belt, a rubber crawler, and various kinds of hoses.

For example, in the case where the vulcanized rubber of the present invention is applied to a tire, the structure of the tire is not particularly limited, as far as the rubber composition of the present invention is used, and may be appropriately selected depending on the purpose. The tire is excellent in the abrasion resistance without the deterioration of the crack resistance and the low hysteresis loss.

The portion in the tire, to which the rubber composition of the present invention is applied, is not particularly limited, and may be appropriately selected depending on the purpose, and examples thereof include a tire case, a tread, a base tread, a side wall, side reinforcing rubber, and a bead filler.

The method for producing the tire may be an ordinary method. For example, the members that are generally used for producing a tire, such as a carcass layer, a belt layer, and a tread layer, each of which is formed of the rubber composition of the present invention and a cord, are adhered sequentially on a tire molding drum, and the drum is withdrawn to form a green tire. Subsequently, the green tire is vulcanized by heating by an ordinary method to produce the target tire (for example, a pneumatic tire).

EXAMPLES

The properties of carbon black were obtained in the following manners.

1. Compression Dibutyl Phthalate Absorption Number (24M4DBP)

The 24M4DBP (cm$^3$/100 g) was measured according to ISO 6894.

2. CTAB Specific Surface Area

The CTAB specific surface area (m$^2$/g) was measured by a method according to JIS K6217-3:2001 (Determination of specific surface area—CTAB adsorption method).

3. Aggregate Distribution (Centrifugal Sedimentation Method)

The measurement device used was Disk Centrifuge Photosedimentometer (DCP) "BI-DCP Particle Sizer" (produced by Brookhaven Instruments Corporation). The measurement was performed according to ISO/CD 15825-3 as follows.

0.05 to 0.1% by mass of carbon black was added to a 25% by volume ethanol aqueous solution containing a small amount of a surfactant, and completely dispersed by performing an ultrasonic treatment (½ inch oscillation chip, output power: 50 W) to prepare a dispersion liquid. To a rotary disk with a rotation number of 8,000 rpm having 17.5 mL of distilled water as a sedimentation liquid (spin liquid) added thereto, 0.02 to 0.03 mL of the dispersion liquid was added. The recorder was applied simultaneously with the addition of the dispersion liquid, so as to measure optically the amount of the carbon black aggregate passing the point in the vicinity of the outer periphery of the rotary disk through sedimentation, and the absorbance (frequency) thereof with respect to time was recorded as a continuous curve. The sedimentation time was converted to the Stokes equivalent diameter d by the following Stokes' general expression (1) to provide the corresponding curve of the Stokes equivalent diameter and the frequency of the aggregate.

$$d = K/\sqrt{t} \qquad (1)$$

In the expression (1), d represents the Stokes equivalent diameter (nm) of the carbon black aggregate passing the optical measurement point of the rotary disk after the elapse of t minutes. The constant K is a value that is determined by the temperature, the viscosity, and the difference in density from the carbon black (the true density of the carbon black is assumed to be 1.86 g/cm$^3$) of the spin liquid at the time of measurement, and the rotation number of the rotary disk. In Examples and Comparative Examples, the spin liquid used was 17.5 mL of distilled water, the measurement temperature was 23.5° C., and the rotation number of the disk was 8,000, resulting in the constant K of 261.75.

The mode diameter $D_{st}$ (nm), the half value width $\Delta D_{50}$ (nm), and the ratio ($\Delta D_{50}/D_{st}$) were obtained form the measurement results. The mode diameter $D_{st}$ and the half value width $\Delta D_{50}$ are defined as follows.

Mode diameter $D_{st}$: The Stokes equivalent diameter providing the maximum frequency on the corresponding curve of the Stokes equivalent diameter and the frequency of the aggregate Half value width $\Delta D_{50}$: The width at the half height of the maximum point of the frequency on the corresponding curve of the Stokes equivalent diameter and the frequency of the aggregate

INDUSTRIAL APPLICABILITY

The use of the rubber composition of the present invention can provide vulcanized rubber excellent in the abrasion resistance without the deterioration of the crack resistance and the low heat generation property, and therefore tires using the rubber composition of the present invention can be favorably applied to a tire case, a tread member, and the like of various tires for passenger automobiles, light passenger automobiles, light truck, heavy automobiles (such as trucks, buses, and off-the-road tires (e.g., mine vehicles, construction vehicles, and small trucks), and the like.

The invention claimed is:

1. A rubber composition comprising:
(A) a rubber component;
(B) carbon black having a cetyltrimethylammonium bromide specific surface area of 110 to 160 $m^2/g$, a half value width $\Delta D_{50}$ of a peak including a Stokes equivalent diameter $D_{st}$ providing a maximum frequency in an aggregate distribution obtained by a centrifugal sedimentation method of 60 nm or less, and a ratio ($\Delta D_{50}/D_{st}$) of the $\Delta D_{50}$ and the $D_{st}$ of 0.95 or less; and
(C) silica having a cetyltrimethylammonium bromide specific surface area of 200 $m^2/g$ or more,
having a total amount of the carbon black (B) and the silica (C) of 30 to 80 parts by mass per 100 parts by mass of the rubber component (A), and
having a ratio (b)/(c) of a content (b) of the carbon black (B) and a content (c) of the silica (C) of 60/40 to 85/15.

2. The rubber composition according to claim 1, wherein the carbon black (B) has a compression dibutyl phthalate absorption number of 80 to 110 $cm^3/100$ g.

3. The rubber composition according to claim 1, wherein the rubber component (A) contains natural rubber.

4. A tire comprising the rubber composition according to claim 1.

5. The rubber composition according to claim 2, wherein the rubber component (A) contains natural rubber.

6. The tire comprising the rubber composition according to claim 2.

7. The tire comprising the rubber composition according to claim 2, wherein the rubber component (A) contains natural rubber.

* * * * *